July 14, 1964    D. E. KRUP    3,140,861
MIXING DEVICE

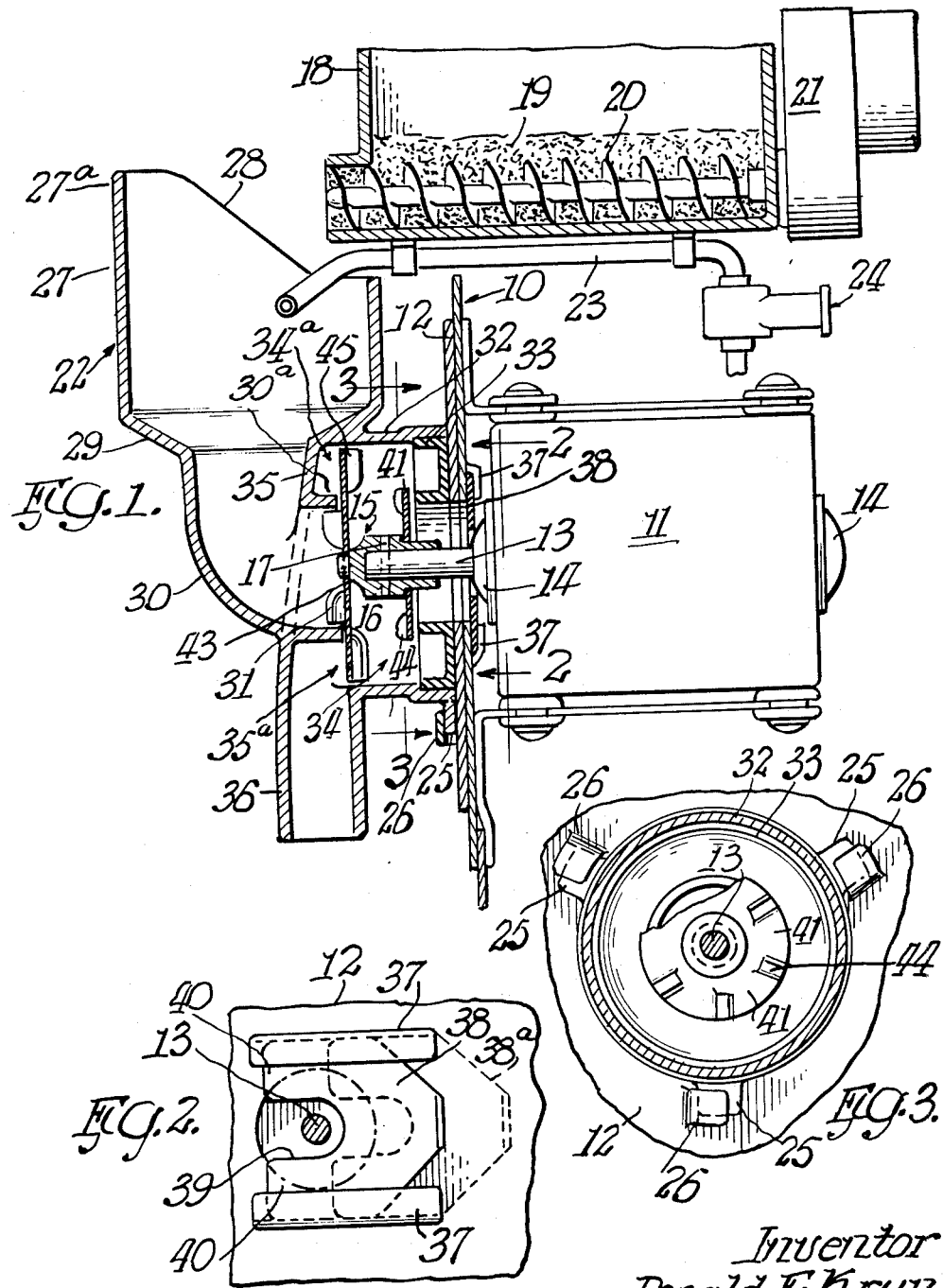

Filed Aug. 6, 1962    2 Sheets-Sheet 2

Inventor
Donald E. Krup
by Dawson Tilton, Fallon
Lungmus & Alexander
Attys

United States Patent Office 3,140,861
Patented July 14, 1964

3,140,861
MIXING DEVICE
Donald E. Krup, Box 112C, Rte. 2, Elgin, Ill.
Filed Aug. 6, 1962, Ser. No. 215,765
16 Claims. (Cl. 259—10)

This invention relates to a mixing device, and, more particularly, to a device useful in connection with the mixing and dispensing of powdered food or beverage materials into a liquid.

The invention here has special utility in connection with the development of uniform mixtures of milk, chocolate, and the like. Such materials may be provided in powdered form and mixed with water of an appropriate temperature. An important problem in this operation is the development of a uniform dispersion of the particles rapidly and with relatively uncomplex equipment. Here, it will be appreciated that complex equipment usually requires servicing by trained personnel, and such is not available at the site of a food dispenser.

The provision of apparatus for solving the foregoing problem constitutes an important objective of this invention. Another object is to provide a mixing device characterized by a novel impeller. Still another object of the invention is to provide mixing apparatus characterized by flow conduits and a mixing chamber in which a unique impeller is mounted which results in the rapid development of a uniform liquid food mixture which is whipped to an aerated consistency at low cost. Yet another object is to provide by means of the unique impeller a pumping action which will draw in mix and force out the mixture of liquid and powder as well as a controlled amount of air. Other objects and advantages of the invention may be seen in the details of construction and operation set down in this specification.

The invention will be explained in conjunction with an illustrative embodiment in the accompanying drawing, in which—

FIG. 1 is a fragmentary elevational view, partially in section, of apparatus embodying the inventive teachings;

FIG. 2 is a sectional view of the apparatus of FIG. 1 taken along the line 2—2 of FIG. 1;

FIG. 3 is a sectional view taken along the line 3—3 of FIG. 1;

Figure 6:
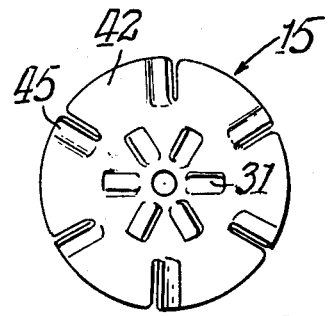
FIG. 6 is an elevational view of the impeller used in the apparatus.

In the illustration given, and with particular reference to FIG. 1, the numeral 10 designates generally a mounting frame which carries the apparatus and which is shown fragmentarily for the sake of illustration. The frame 10 is seen to support a motor 11 and a mounting plate 12— the plate 12 also being seen in FIG. 4. The motor 11 is equipped with the usual shaft 13 suitably borne in motor bearings 14. Fixed on the shaft 13 is an impeller generally designated 15 which also can be seen in FIG. 6. For this purpose, the impeller 15 may be equipped with a bore 16 through which a pin 17 is inserted, the pin 17 also passing through a diametrical bore in the shaft 13. In this fashion, the impeller 15 rotates as the motor turns.

The food or beverage material to be mixed and dispensed is provided in a container 18 (seen only in FIG. 1), and the material may be chocolate, milk powder, potato, etc. For discharging the powder 19 from the container 18, the container 18 is equipped with an auger 20 suitably driven by a motor 21. The powdered material 19 is driven by the auger 20 laterally for discharge into a casing generally designated by the numeral 22 and which can be seen in perspective view in FIG. 5.

Liquid for mixing with the powder 19 is also introduced into the casing 22 by means of a pipe 23 (see FIG. 1), suitably equipped with a solenoid valve 24, which regulates the amount of liquid flowing through the pipe 23 from a source (not shown).

The casing 22 provides a housing for the impeller 15, and for this purpose it will be seen that the housing 22 is equipped with a plurality of radially-extending lugs 25. These lugs are rotated into place underneath clips 26 provided as part of the mounting plate 12.

Figure 5:
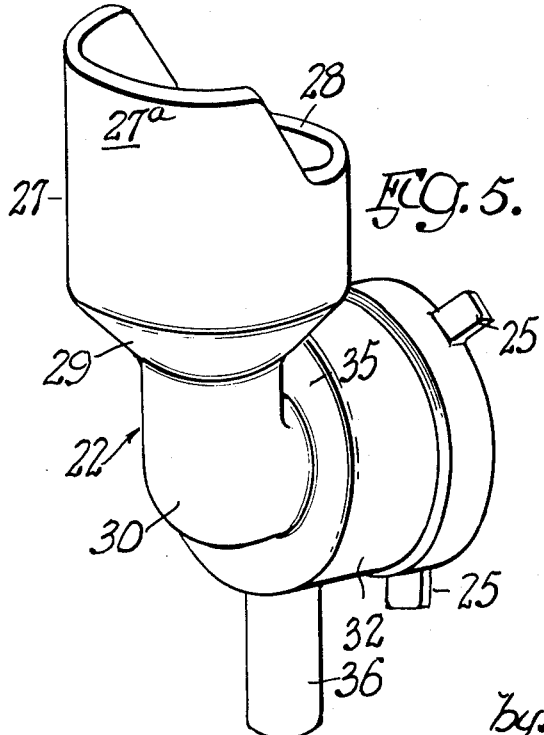
FIG. 5 is a perspective view of the impeller casing portion of FIGS. 1 and 4.

As can be best appreciated from a consideration of FIGS. 1 and 5, the casing 22 is equipped with an upper hopper portion 27, which is cut away as at 28 to facilitate the discharge thereinto of the powder 19 and liquid from the pipe 23. The upstanding wall portion as at 27a thus serves as a shield against splashing or powdering. The lower end of the hopper portion 27 is constricted as at 29, and leads into an integral L 30. The L portion 30, as best seen in FIG. 1, receives the inner vanes 31 of the impeller 15.

Extending horizontally and integrally from the hopper portion 27 is a cylindrical portion 32, which is the portion equipped with the lugs 25. The cylindrical portion 32 is mounted over a mounting ring 33 provided as part of the mounting plate 12.

From the foregoing, it will be seen that assembly and disassembly of the apparatus is quickly carried out merely by rotating the casing 22 (counterclockwise as seen in FIG. 3) to disengage the lugs 25 from under the clips 26, whereupon the cylindrical portion 32 is retracted from its ensleeved relation with the impeller 15. The impeller 15 likewise can be conveniently removed by first removing the pin 17 from the bore 16. The cut-away portion 28 permits the casing 22 to be rotated without interfering with the auger 20, and the pipe 23 may be constructed of a relatively flexible plastic material so as to deform slightly to accommodate rotational movement of the casing 22.

The cylindrical portion 32 of the casing 22 defines a mixing chamber 34. The chamber 34 is defined also by an annular end wall 35 provided as an integral portion of the casing 22 which is centrally apertured by the L portion 30, the L portion projecting slightly into the chamber 34 as at 30a (see FIG. 1). The annular end wall 35 is outwardly and downwardly inclined (see FIG. 1) and is interrupted at its lowermost point as at 35a to provide a discharge opening communicating with a centrally located depending spout portion 36.

The rear or motor end wall of the chamber 34 is defined in part by the mounting ring 33 provided as part of the mounting plate 12. Rearwardly of the mounting plate 12, the plate 10 is seen to be equipped with guides 37 in which a slide 38 is positionably mounted. The retracted position is seen in dotted line and is designated 38a. The slide 38 is equipped with a recess or cut-out portion 39 which permits the slide to extend beyond the shaft 13 as at 40.

The impeller 15 is equipped with a spinner or smaller impeller portion 41 which serves to draw air into the chamber 34 through the recess or cut-out portion 39, thereby preventing a build-up of food material on the motor 11, shaft 13, etc. The air also serves a primary purpose in developing a frothy product, and the degree of froth or aerated consistency is regulated by the position of slide 38, as indicated in FIG. 2.

Figure 4:
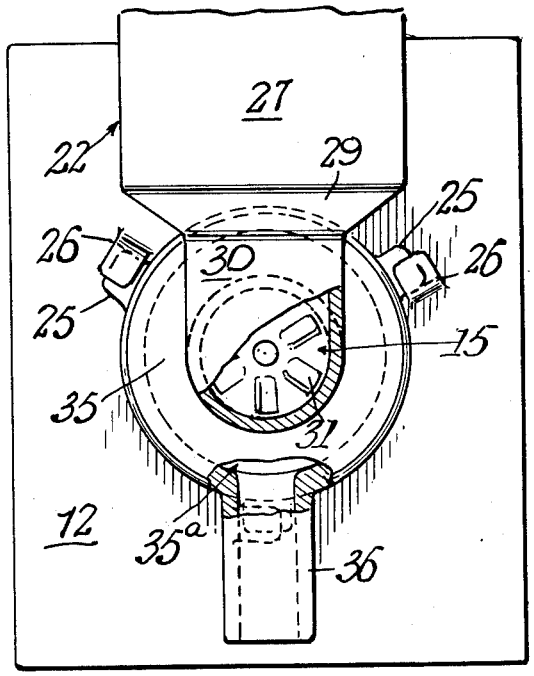
FIG. 4 is a front elevational view, partially broken away, of the structure seen in FIG. 1.

As can be seen from FIGS. 1 and 4, the L 30 provides a material inlet for the chamber 34 which is concentric to the axis of the impeller shaft 13.

Reference to FIGS. 1 and 5 reveals that the impeller 15 is essentially disc-like, i.e., planar and circular in out-line. The plate-like portion is designated 42 and is centrally apertured for the receipt of a bushing 43. The bushing 43 is the portion equipped with the bore 16 and also supports the smaller impeller or spinner 41. The spinner 41 is seen in FIG. 3 to have forwardly-extending blades as at 44 which serve to draw in the air for cleansing and aeration purposes.

The impeller body 42 is equipped with two sets of blades or vanes, an inner set being made up of the previously referred-to blades 31 and an outer set made up of blades designated 45. It will be seen that the inner set of blades 31 project forwardly out of the planar body 42 into the L 30, while the outer blades 45 are in general alignment with the annular space 34a defined by the forwardly-projecting lip 30a of the L 30 and the inner wall of the cylindrical portion 32. Also, the outer blades 45 extend rearwardly, i.e., away from the inner blades and the hopper 27.

Optimally, the blades 31 and 45 are provided integral with the disc—being formed my molding in plastic or forming a metallic disc and then upsetting the disc material so as to have the blades struck from the metal disc. A stainless steel is especially suitable for this purpose, which additionally makes it possible to vary the pitch of the blades to accommodate different material. As the blades are upset to a position more angular relative to the plane of the disc, the mixing is more violent and the fluid motion more rapid—thus the pumping action more pronounced. This also controls the degree of aeration so as to develop an aerated mixture of the consistency desired. By retarding the flow, finer aeration is achieved and by increasing the flow by faster pumping action, a coarser, less aerated, beverage is dispensed.

In the operation of the device, requisite amounts of the powder 19 and liquid from pipe 23 are introduced into the hopper 27, from which they flow by gravity against the impeller 15. The material first impinges against the inner blades 31 to be dispersed and mixed, and thereafter the partially wet material flows axially to the right in FIG. 1 and into the cylindrical chamber 34, where it is further whipped under the influence of the outer blade 45, air being introduced during this phase of the operation by virtue of the spinner 41 equipped with the blades 44.

As more material is whipped and passes into the annular portion 30a, it forces material out of the spout 36.

While in the foregoing specification I have set down a detailed description of an embodiment of the invention for the purpose of illustration thereof, many variations in the details herein given may be made by those skilled in the art without departing from the spirit and scope of the invention.

I claim:

1. In a mixing device of the character described,
   (A) a generally cylindrical housing,
      (i) said housing being equipped with an axial inlet at one end and an outlet adjacent the inlet,
      (ii) said housing being equipped with a closure at the other end to define a chamber within said housing,
   (B) a drive shaft extending axially into said housing,
   (C) an impeller on said shaft adjacent said inlet, said impeller being
      (i) essentially planar and disposed normal to said axis,
      (ii) equipped with outer blades adjacent the impeller periphery projecting away from said inlet, and
      (iii) equipped with inner blades adjacent said shaft and projecting toward said inlet.

2. The structure of claim 1 in which said blades are integral with said impeller.

3. The structure of claim 2 in which said impeller is constructed of metal whereby the pitch of said blades can be varied to accommodate various types of products and degrees of mixing and whipping.

4. The structure of claim 1 in which the inner blades are positioned generally between the outer blades.

5. In a dispensing mixer,
   (A) a generally cylindrical chamber having an end wall equipped with an axial inlet and an outlet,
   (B) a circular disc-like impeller rotatably mounted in said chamber adjacent said inlet, said impeller having
      (i) a plurality of generally radially disposed inner blades, and
      (ii) a plurality of generally radially disposed outer blades, said inner and outer blades being radially offset from each other and with each plurality extending outwardly on opposite sides of said impeller with said inner blades extending towards said inlet, and
   (C) means for rotating said impeller.

6. The structure of claim 5 in which said inlet is equipped with wall portions extending into said chamber to define an annular space, said outlet communicating with said annular space.

7. The structure of claim 6 in which said inlet wall portions receive said inner blades.

8. The structure of claim 5 in which said impeller is positioned adjacent said inlet to define a cylindrical mixing space adjacent the side of said impeller from which said outer blades project.

9. In a liquid food mixer, or the like,
   (A) a frame supporting a hopper,
   (B) means for supplying granular food and liquid material to said hopper,
   (C) a generally cylindrical mixing chamber coupled to the outlet of said hopper and positioned with the chamber axis generally horizontal with said materials being introduced axially into said chamber, said chamber being equipped with an outlet adjacent the end into which said materials are axially introduced,
   (D) a circular disc-like impeller in said chamber adjacent said material introduction end,
      (i) said impeller having a group of generally radially disposed inner blades projecting toward said end, and
      (ii) a group of generally radially disposed outer blades projecting away from said end, and
   (E) means for rotating said impeller.

10. The structure of claim 9 in which said means for supplying granular food material includes an auger.

11. The structure of claim 9 in which said outlet includes a pipe extending generally downwardly relative to said axis to discharge mixed liquid food in the direction angularly opposite to the direction of material introduction into said chamber.

12. The structure of claim 11 in which said pipe is provided integral with said chamber, with said outlet being located immediately adjacent said end, said pipe extending beyond said one end.

13. In a dispensing mixer,
   (A) a generally cylindrical chamber having an axial inlet and an outlet adjacent said inlet,
   (B) a circular disc-like impeller rotatably mounted in said chamber adjacent said inlet, said impeller having
      (i) a plurality of generally radially disposed inner blades, and
      (ii) a plurality of generally radially disposed outer blades, said inner and outer blades extending outwardly on opposite sides of said impeller with said inner blades extending towards said inlet,
   (C) a second impeller rotatably mounted in said chamber spaced from the first-mentioned impeller in a direction away from said inlet, and
   (D) means for rotating said impellers.

14. In a liquid food mixer, or the like, (A) a frame supporting a hopper,
(B) means for supplying granular food and liquid material to said hopper,
(C) a generally cylindrical mixing chamber coupled to the outlet of said hopper and positioned with the chamber axis generally horizontal with said materials being introduced axially into said chamber, said chamber being equipped with an outlet adjacent the end into which said materials are axially introduced,
(D) a circular disc-like impeller in said chamber adjacent said material introduction end,
  (i) said impeller having a group of generally radially disposed inner blades projecting toward said end, and
  (ii) a group of generally radially disposed outer blades projecting away from said end,
(E) said frame providing a closure for the end of said chamber opposite the material introduction end, said closure being apertured,
(F) a motor mounted on said frame and equipped with a shaft extending through said closure aperture and supporting said disc-like impeller, and
(G) a second impeller mounted on said shaft within said chamber and between said motor and the first-mentioned impeller.

15. The structure of claim 14 in which the second impeller includes a disc-like body having blades laterally extending therefrom in the direction of said first-mentioned impeller.

16. The structure of claim 14 in which said chamber is equipped with an end wall with an inlet for the axial introduction of said materials into said chamber, said end wall being outwardly and downwardly inclined from said impeller.

References Cited in the file of this patent

UNITED STATES PATENTS

| | | |
|---|---|---|
| 1,363,572 | Dalzell | Dec. 28, 1920 |
| 1,670,593 | Miller | May 22, 1928 |
| 1,692,617 | Bowen | Nov. 20, 1928 |
| 3,000,618 | Oakes | Sept. 19, 1961 |